(No Model.)
C. A. FARNHAM.
OBSTETRICAL INSTRUMENT.
No. 365,913. Patented July 5, 1887.
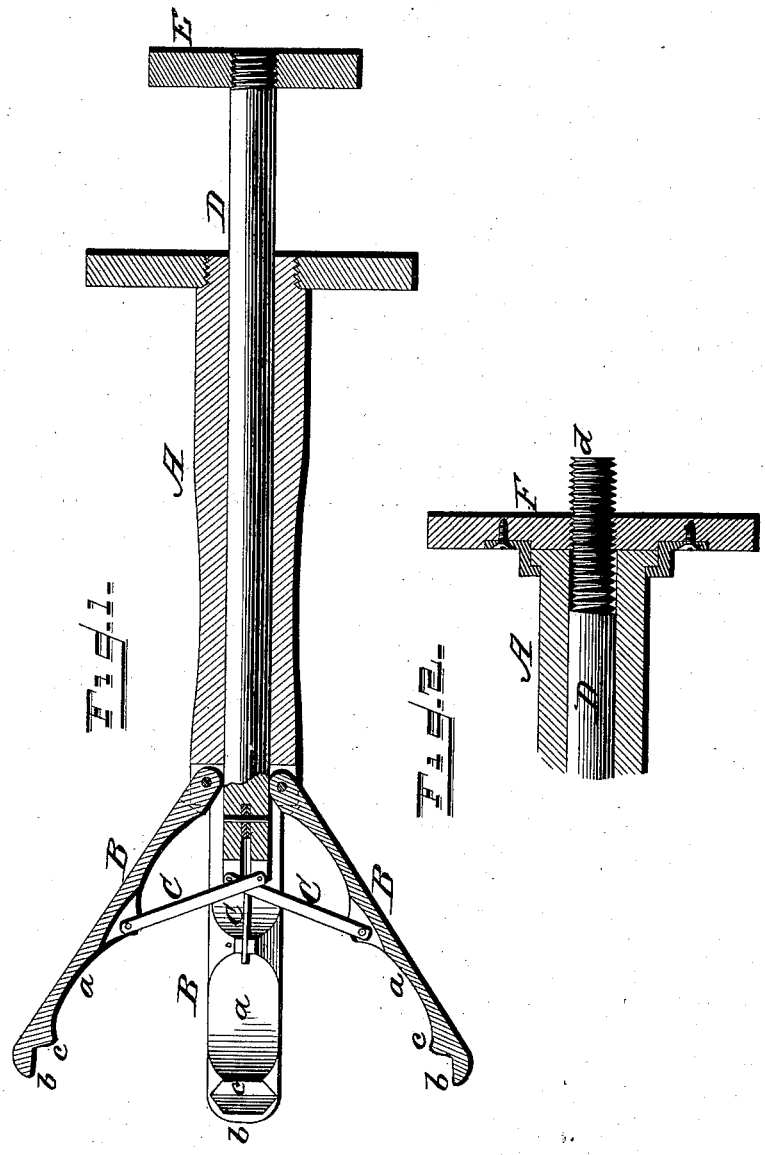

UNITED STATES PATENT OFFICE.

CHARLES ADLASKA FARNHAM, OF AUDUBON, IOWA.

OBSTETRICAL INSTRUMENT.

SPECIFICATION forming part of Letters Patent No. 365,913, dated July 5, 1887.

Application filed April 12, 1887. Serial No. 234,536. (No model.)

*To all whom it may concern:*

Be it known that I, CHARLES ADLASKA FARNHAM, a citizen of the United States, residing at Audubon, in the county of Audubon and State of Iowa, have invented certain new and useful Improvements in Instruments for Relieving Animals of their Offspring; and I do hereby declare that the following is a full, clear, and exact description of the same, reference being had to the annexed drawings, making a part of this specification, and to the letters and figures of reference marked thereon.

Figure 1 of the drawings is a longitudinal section of my improved instrument, with a portion thereof in elevation, and Fig. 2 a detail view, partly in section, showing a modification of the means employed for operating the pivoted jaws.

The object of the present invention is to provide a simple and easily-operating instrument especially adapted for relieving animals of their offspring; and it consists in the details of construction, substantially as shown in the drawings, and hereinafter described and claimed.

In the accompanying drawings, A represents a tube of suitable length and size, to one end of which is pivoted a series of jaws, B. In the present instance I have shown three of these jaws, which may be pivoted in any well-known manner to the tube A, and are concave upon their inner side, as shown at *a*, said jaws being of any suitable width and length, and at their outer extremities are provided with teeth *b c*. At or near the center of the jaws B are pivoted one end of links C, the opposite ends thereof being in like manner pivoted to one end of a push-rod, D, which extends through the tube A, so that by moving said rod in the proper direction the jaws B will be extended or contracted, as desired, so as to fit the object between them and relieve the animal of its offspring without injury thereto or to the animal.

Any suitable means may be employed for operating the rod D, as I do not desire to be confined to the means shown, which consists, in the present instance, of a suitable push handle or knob, E, or, as in Fig. 2, providing a screw-threaded extension, *d*, on the end of the rod, and a nut, F, engaging therewith and connected to the end of the tube A in such manner as to enable it to turn, which will cause the rod to move in the proper direction, the latter means of operating the rod being preferable, as greater leverage power is obtained.

Having now fully described my invention, what I claim as new, and desire to secure by Letters Patent, is—

In an instrument for relieving animals of their offspring, a tube provided with pivoted jaws having teeth at their extremities, in combination with a rod extending through the tube and connected to the jaws by pivoted links, by which said jaws may be extended or contracted, as desired, and for the purpose set forth.

In testimony that I claim the above I have hereunto subscribed my name in the presence of two witnesses.

CHARLES ADLASKA FARNHAM.

Witnesses:
W. S. CLAWSON,
B. G. FOREMAN.